United States Patent [19]

Saito et al.

[11] Patent Number: 4,489,861

[45] Date of Patent: Dec. 25, 1984

[54] MANUAL LIQUID DISPENSING DEVICE

[75] Inventors: Tadao Saito; Takaharu Tazaki, both of Tokyo, Japan

[73] Assignee: Yoshino Kogyosho Co., Ltd., Tokyo, Japan

[21] Appl. No.: 230,944

[22] PCT Filed: May 21, 1979

[86] PCT No.: PCT/JP79/00130
  § 371 Date: Jan. 21, 1981
  § 102(e) Date: Jan. 15, 1981

[87] PCT Pub. No.: WO80/02516
  PCT Pub. Date: Nov. 27, 1980

[51] Int. Cl.³ .............................................. B05B 11/00
[52] U.S. Cl. ..................................... 222/207; 222/214; 222/380; 222/383; 137/512.4; 137/853; 417/560; 417/566
[58] Field of Search ............. 222/380, 383, 207, 214; 137/512.4, 853, 860; 239/331, 333; 417/560, 566

[56] References Cited

U.S. PATENT DOCUMENTS

| 2,856,863 | 10/1958 | Folley | 137/512.4 |
| 3,187,960 | 6/1965 | Gorman | 222/380 X |
| 3,527,551 | 9/1970 | Kutik et al. | 222/380 X |
| 4,124,148 | 11/1978 | Vieler et al. | 222/402.15 X |
| 4,225,061 | 9/1980 | Blake et al. | 222/383 X |
| 4,227,628 | 10/1980 | Parsons | 222/380 |
| 4,227,650 | 10/1980 | McKinney | 222/380 X |

Primary Examiner—Joseph J. Rolla
Assistant Examiner—Frederick R. Handren
Attorney, Agent, or Firm—Parkhurst & Oliff

[57] ABSTRACT

This invention relates to a manual liquid dispensing device for spraying liquid by squeezing the trigger thereof. An adapter is inserted into a cylinder bore forming a pressurizing chamber. A piston is slidably mounted within the adapter. This adapter has an inlet communicating with the intake portion and an outlet communicating with an outlet passage to a nozzle hole formed at the bottom end thereof. A valve advantageously formed is attached to the end of the adapter to open only the inlet at pressure reducing time of the pressurizing chamber and to open only the outlet at pressurizing time. This valve is made of elastic material as a single unit.

7 Claims, 9 Drawing Figures

MANUAL LIQUID DISPENSING DEVICE

TECHNICAL FIELD

This invention relates to a manual liquid dispensing device for spraying liquid such as cleanser, cosmetic chemical or the like in a simple structure by employing a valve having both intake and exhaust functions of the liquid within a cylinder bore and, more particularly, to a liquid dispensing device of trigger operated type made of plastic material such as polyethylene, polypropylene, nylon or the like adapted for an automatic assembling production at a minimum of number of parts.

BACKGROUND ART

A manual liquid dispensing device is widely used, because it can spray liquid through a nozzle hole or orifice by manually squeezing a trigger to thereby compress the liquid. Since the sprayer of this type has a stainless steel ball check valve disposed in the intake portion and a free cylindrical valve disposed in a nozzle portion to move with respect of the opening and closing operation of the check valve as disclosed, for example, U.S. Pat. No. 3,685,739, has a complicated structure to thereby require sophisticated assembly steps. As the piston slidably mounted into a cylinder bore of this sprayer consists of a piston body interlocked to a trigger, a rubber cap-shaped piston washer slidably contained within the cylinder bore, and a returning coil spring, it necessitates a complicated automatic assembly line due to numerous number of components.

Accordingly it is an object of the present invention to provide a liquid dispensing device which can eliminate all the disadvantages of the conventional trigger operated liquid sprayer and can readily be automatically assembled into a simple structure.

The present invention provides a liquid dispensing device which can prevent the negative pressure buildup in the container during its priming time by inserting a cylindrical adapter having stepwise cylinder bore diameters and a hole perforated at the side wall thereof into the cylinder bore.

The present invention provides a liquid dispensing device which can prevent liquid form flowing into the space formed between the cylinder bore and bellows interposed between the adapter and the piston within the cylinder bore with a gap formed to communicate with a liquid container by separating part of the adapter end from the cylinder bore wall when the piston is reciprocately mounted into the cylinder bore for smooth spraying operation.

DISCLOSURE OF THE INVENTION

The present invention provides an improved liquid dispensing device for spraying liquid by advantageously incorporating a cylindrical valve made of synthetic or natural rubber slidably mounted within the cylinder bore of the body thereof. This valve is formed of single elastic material for operating to open only an outlet of liquid at a trigger squeezing time and to open only an inlet of the liquid at a trigger releasing time. Since only such a valve is employed both intake and exhaust the liquid, it can reduce the number of parts and can also smoothly operate a pumping action in the manual liquid dispensing device.

BEST MODE FOR CARRYING OUT THE INVENTION

The present invention will be described in detail with reference to accompanying drawings.

FUNDAMENTAL EMBODIMENT

Figure 1:
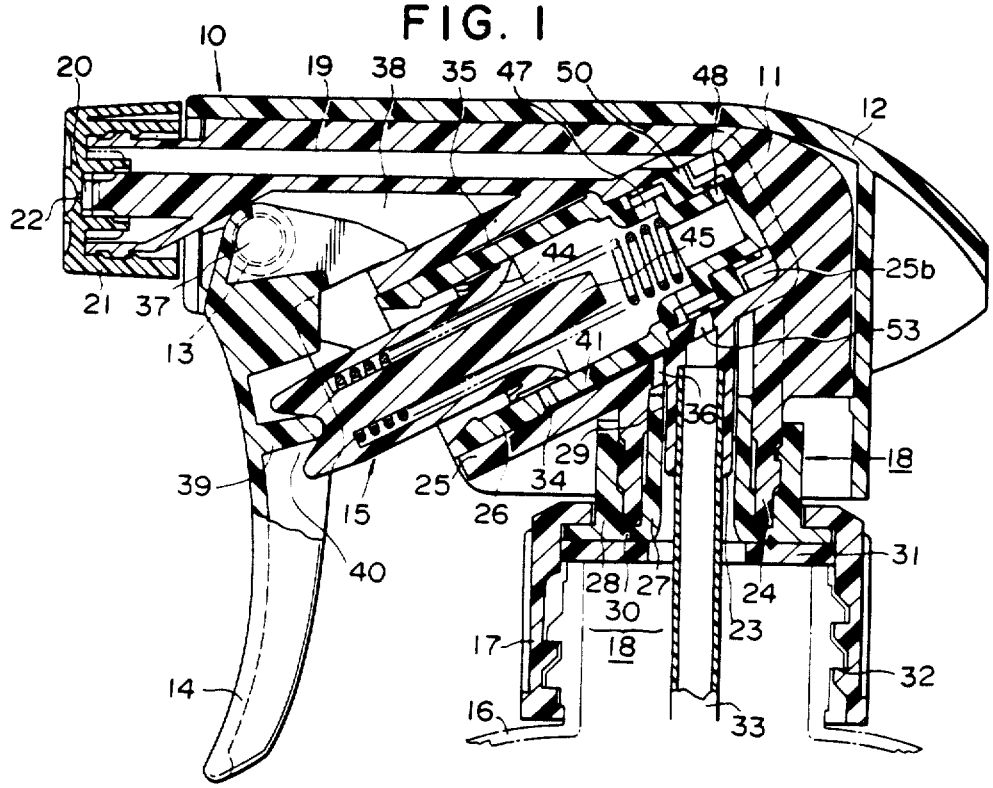
FIG. 1 is vertical sectional view of a manual liquid dispensing device of a preferred embodiment of the present invention used for spraying liquid.

FIG. 1 shows one preferred embodiment of the liquid dispensing device according to the present invention, the liquid dispensing device is made of plastic material except for a valve and a returning coil spring. The structural components of the liquid dispensing device are molded from strong materials such as polypropylene, nylon or the like. The other components such as a cylinder adapter, piston, bellows, and intake or suction pipe requiring flexibility or watertinghtness are molded from materials such as polyethylene (PE)or ethylene-vinyl acetate copolymer (EVA).

The liquid dispensing device 10 comprises a body 11 having a pressurizing chamber or cylinder bore therein, a shroud or shroud member 12 enclosing the body 11 to form the entire liquid dispensing device profile, a trigger or manually operated element 14 vertically hung from a mounting recess 13 formed at the end of the shroud 12, a slidably movable piston 15 within a cylinder bore 25 by manually squeezing the trigger 14, an internally threaded cap or closure 17 screwed on the externally threaded neck of a container 16, and an intake portion 18 interposed between the container 16 and the cap 17.

The body 11 has a horizontal, vertical, and oblique portions. The horizontal portion of the body 11 has an outlet passage 19 for flowing liquid to be sprayed, a spinner element 20 formed at the end of the passage 19, and a cap 21 formed with a nozzle hole or orifice 22 and provided on the spinner element 20. The vertical portion has inner and outer tubular portions 23 and 24 integrally projected from the body 11 to be engaged with the intake portion 18. The oblique portion has a cylinder bore 25 formed to engage an adapter 26 therein. The adapter 26 has three stepwise cylinder bore diameters as a pressurizing chamber as will be described hereinafter in greater detail. The intake portion 18 has inner and outer tubular portions 27 and 28 for holding the outer tubular portion 24 of the body 11 from inside and outside walls of the outer tubular portion 24. An annular gap 29 is formed between the inner tubular portion 23 of the body 11 and the inner tubular portion 27 to vent the air at priming time. The inner and outer tubular portions 27 and 28 are integrated at the lower flange 30, which is held between the upper edge of the cap 17 and a gasket 31 filled in the intake poriton 18. The cap 17 is internally threaded and is screwed on a threaded neck 32 of the liquid container 16. An intake or suction pipe 33 is inserted into the inner tubular portion 23 of the body 11 to be dipped in the liquid in the container 16 to intake the liquid into the pressurizing chamber of the adapter 26. A hole 34 is perforated at the adapter 26 to communicate with a gap 35 formed on the outer periphery of the adapter 26. In addition, a hole 36 is also perforated at the top of the inner tubular portion 27 of the body 11 to communicate with the gap 35.

The trigger 14 is engaged at the upper lug 37 thereof with the mounting recess 13 formed in the vicinity of the end of the side plate 38 of the shroud 12 to be thus hung down from the recess 13. The trigger 14 has a pivot 39 formed at the inside center thereof and engaged with a recess 40 formed at the end of the piston 15. The adapter 26 has large diameter, intermediate diameter, and small diameter bores 41, 42, and 43, and is inserted into the cylinder bore 25. The outer sliding contact portion 44 of the piston 15 is watertightly slidably inserted telescopically into the large diameter bore 41 of the adapter 26. A coil spring 46 is provided in compression between the inside bottom of the piston 15 and the shoulder of the small diameter bore 43 of the adapter 26 to elastically return the piston 15 outwardly. The piston 15 has an inner stem 45 integrally axially projected from the inside bottom thereof. This inner stem 45 of the piston 15 serves to adjust the volume of the pressurizing chamber and to operate as a coil spring guide.

Figure 2:
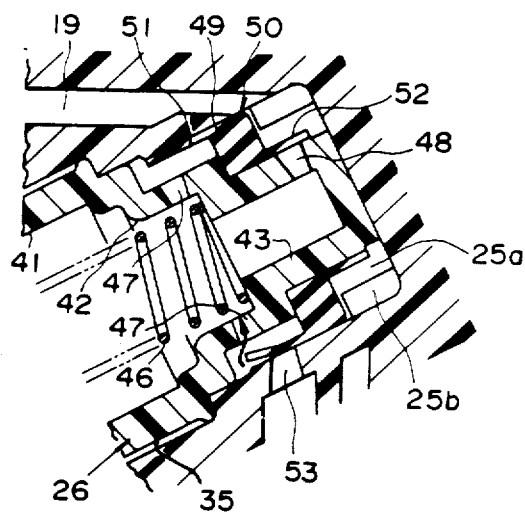
FIG. 2 is a partially enlarged sectional view of the valve in the liquid dispensing device shown in FIG. 1.

The hole 34 is perforated at substantially center of the large-diameter bore 41 of the adapter 26 as described above to prevent the negative pressure buildup in bore 41, and the gap 35 is provided at the outer periphery of the adapter 26 at the inner position from the hole 34 for air vent to communicate with a hole 36 perforated at the top of the inner tubular portion 27 of the body 11. A hole 47 is perforated at the intermediate diameter bore 42 of the adapter 26 as shown in FIGS. 1 and 2. An outlet hole 48 is perforated at the side wall of the small diameter bore 43 of the adapter 26 to communicate with the outlet passage 19. A rubber valve 50 of Z shape in cross section is provided on the side peripheral wall of the small diameter bore 43 of the adapter 26 as shown in enlarged manner in FIG. 2.

The valve 50 has an annular thick body 49, an annular thin portion 51 integrally extended from the outer edge thereof axially, and another annular thin portion 52 integrally extended from the other inner edge thereof axially. If valve 50 is provided in the small diameter bore 43 of the adapter 26, it closes an inlet 53 communicating with the intake portion 18 of the container 16 via the annular thin portion 51 thereof and also closes the outlet hole 48 communicating with the outlet passage 19 via the annular thin portion 52 thereof. The end surface of the small diameter bore 43 of the adapter 26 is brought in contact with the inner bottom of the cylinder bore 25 to form an annular chamber 25a between the adapter 26 and the inner peripheral wall of the cylinder bore 25 with a stopper 25b attached to the inner peripheral and bottom walls of the cylinder bore 25 to be brought into contact with the annular thick body 49 of the valve 50 to thereby control the position of the valve 50 as shown in FIG. 2. Thus, since only the valve 50 operates to intake and exhaust the liquid in the same manner as will be described with reference to the following preferred several embodiments of the present invention to thereby eliminate the check valve in the intake portion and the free valve in the nozzle portion in order to reduce the number of parts for an easy automatic assembling operation.

The operation of the liquid dispensing device thus constructed according to the present invention is as follows: When the trigger 14 is squeezed twice or three times to spray the liquid from the liquid dispensing device, the liquid in the container is taken into the pressurizing chamber of the liquid dispensing device to enable priming of the device. More particularly, when the trigger 14 is squeezed as shown in FIG. 1, the piston 15 is retracted into the adapter 26 against the tension of the coil spring 46. If the sliding contact portion 44 of the piston 15 passes over the hole 34 of the adapter 26, the atmospheric air communicates through the annular gap 29, the hole 36, and the hole 34 with the air in the container 16 to prevent negative pressure buildup in container 16. When the piston 15 is further retracted into the adapter 26, the pressurizing chamber is pressurized further to thereby expand the annular thin portion 52 of the valve 50 so as to discharge the compressed air through the outlet hole 48, the outlet passage 19, and the spinner element 20 externally from the nozzle hole 22. When the trigger 14 is then released, the piston 15 is extended from the adapter 26 by the tension of the coil spring 46 to thereby reduce the pressure in the cylinder bore 25 so as to close the annular thin portion 52 of the valve 50 and to open the annular thin portion 51 to this intake the liquid from the container 16 through the intake pipe 33 and the inlet 53 into the adapter 26 as shown in FIG. 2 to fill the liquid into the adapter 26. The hole 34 is closed by the sliding contact portion 44 of the piston 15 at the rear extending stroke of the piston 15 as shown in FIG. 1.

The liquid is filled within the adapter 26 by the several operations of the trigger squeezing and releasing actions of the liquid dispensing device. If the trigger 14 is further squeezed again, the liquid in the adapter 26 is pressurized to open the annular thin portion 52 of the valve 50 to thereby spray the liquid through the outlet hole 48, the outlet passage 19, and the spinner element 20 from the nozzle hole 22. The pressure in the adapter 26 is reduced at the extending stroke of the piston 15 upon release of the trigger 14 to thereby open the annular thin portion 51 of the valve 50 so as to intake and supply the liquid from the container 16, and vice versa to close the annular thin portion 51 of the valve 50 and to open the annular thin portion 52 at the retracting stroke of the piston 15 into the adapter 26 upon squeezing of the trigger 14.

FIRST EMBODIMENT

Figure 3:
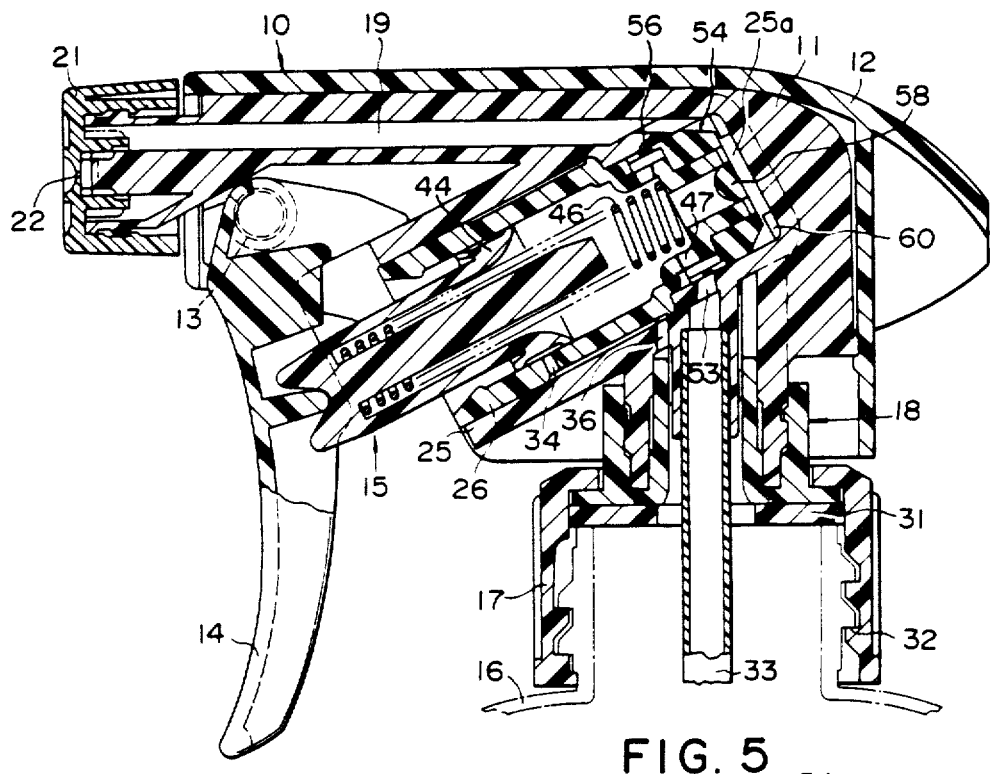
FIG. 3 is a vertical sectional view of a liquid dispensing device of another preferred embodiment of the present invention.
Figure 4:
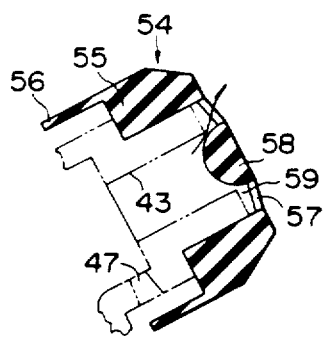
FIG. 4 is a partially enlarged sectional view of the valve in the liquid dispensing device at liquid intake time in FIG. 3.
Figure 5:
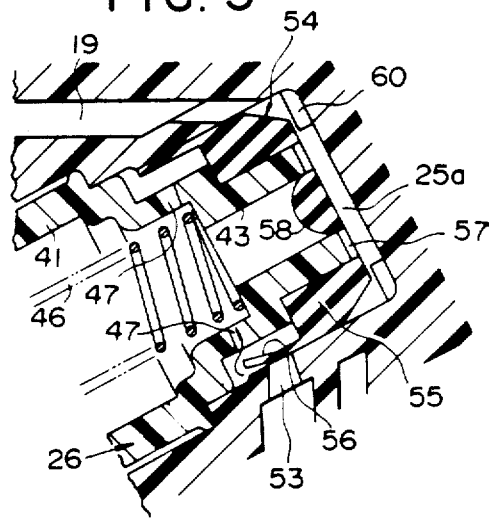
FIG. 5 is a partially enlarged sectional view of the valve in the device at liquid exhausting time in FIG. 3.

FIGS. 3 through 5 show another preferred embodiment of the liquid dispensing device employing the modified valve at the end of the adapter according to the present invention. The adapter 26 of this preferred embodiment of the present invention has large diameter, intermediate diameter, and small diameter bores 41, 42, and 43, a hole 34 perforated at the large diameter bore 41 thereof to prevent the bore 41 from becoming negative pressure, gap 35 formed on the outer periphery thereof, and a hole 47 perforated at the intermediate-diameter bore 42 thereof in the same manner as the first preferred embodiment shown in FIG. 1. The bottom end of the small-diameter bore 43 of the adapter 26 is removed, and modified valve 54 is instead disposed at the bottom of the adapter 26. The valve 54 has, as shown in expanded manner in FIG. 4, an annular thick body 55 of trapezoidal cross section, an annular thin portion 56 integrally extended from the outer edge thereof axially, a radial coupler 57 integrally radially extended at the other end thereof, and a semispherical portion 58 formed with a flat outside at one side and with curved projection at the other at the center thereof. This semispherical portion 58 of the valve 54 has the size for closing the opening 59 of the small diameter bore 43 of the adapter 26 (corresponding to the outlet of the pressurizing chamber.). The chamber 25a is formed at the bottom of the adapter 26 to communicate with the outlet passage 19 with a stopper 60 attached to the inner peripheral and bottom walls of the cylinder bore 25 to be brought into contact with the annular thick body 55 of the valve 54 to thereby control the position of the valve 54.

In operation of the preferred embodiment of the liquid dispensing device thus constructed according to the present invention, when the piston 15 is not retracted into the adapter 26 upon no squeezing of the trigger 14, the inlet 53 is closed by the annular thick portion 56 of the valve 54, and the opening 59 is also closed by the semispherical portion 58 of the valve 54. When the trigger 14 is released to extend the piston 15 from the adapter 26, the pressure in the pressurizing chamber is reduced to cause the semispherical portion 58 of the valve 54 to be closely brought into contact with the opening 59 and to attract the annular thin portion 56 inwardly to thereby communicate the hole 47 with the inlet 53 so as to intake the liquid from the container 16 through the intake pipe 33 as shown in FIG. 4. When the trigger 14 is squeezed to retract the piston 15 into the adapter 26, the pressurizing chamber is pressurized to bring the annular thin portion 56 of the valve 54 into the bore wall to close the inlet 53 and to deflect the radial coupler 57 outwardly so as to urge the semispherical portion 58 toward the chamber 25a to thereby open the opening 59 in order to feed the liquid in the pressurizing chamber into the outlet passage 19 as shown in FIG. 5.

The liquid in the container 16 is taken into the pressurizing chamber by the several operations of the trigger squeezing and releasing actions of the liquid dispensing device to spray the liquid through the outlet passage 19 from the nozzle hole 22.

SECOND EMBODIMENT

Figure 6:
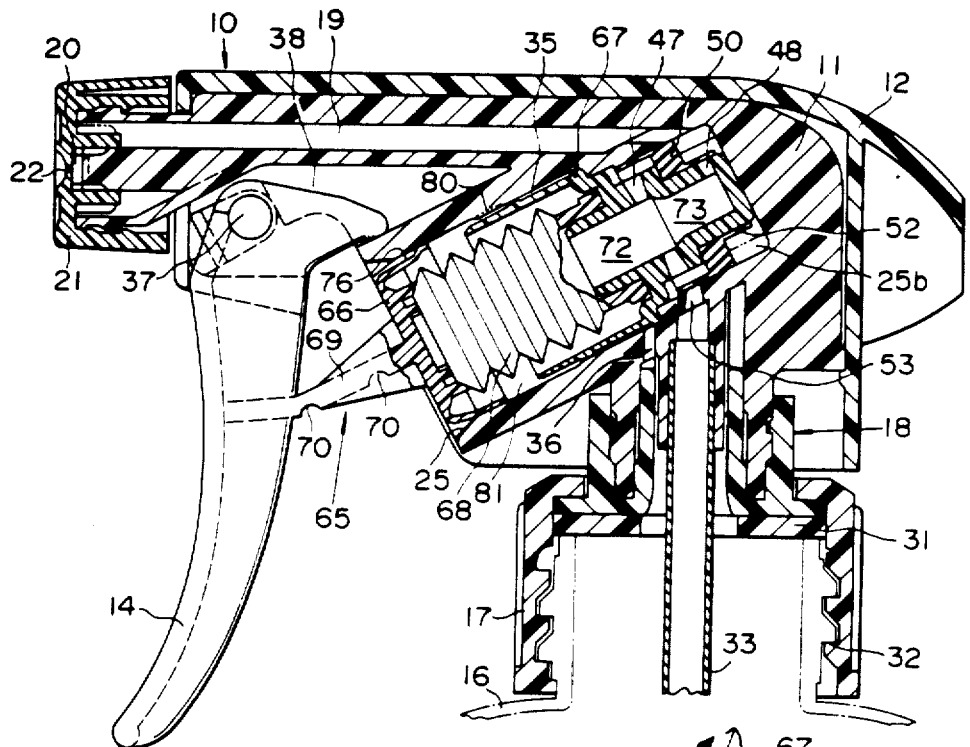
FIG. 6 is a vertical sectional view of a liquid dispensing device of a further preferred embodiment of the present invention.
Figure 7:
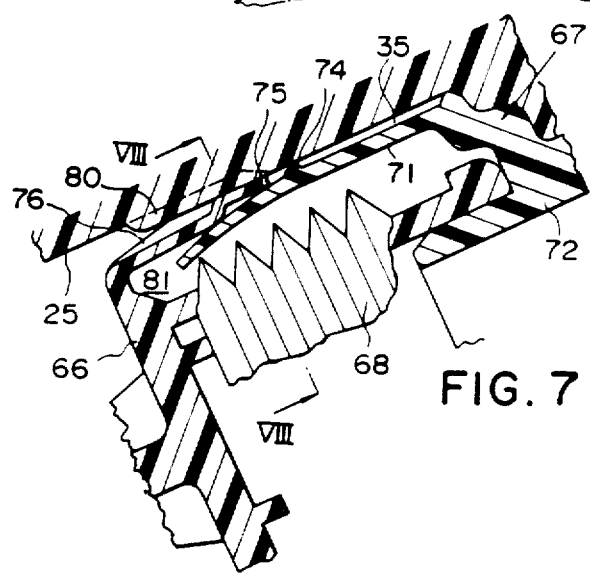
FIG. 7 is a partially enlarged longitudinally sectional view of the liquid dispensing device at operating time in FIG. 6.
Figure 8:
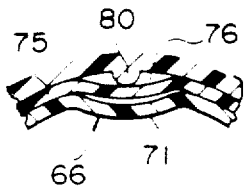
FIG. 8 is a partially enlarged laterally sectional view of the device taken along the line VIII—VIII in FIG. 7.

FIGS. 6 through 8 show a further preferred embodiment of the liquid dispensing device employing modified a piston and adapter according to the present invention. The piston 65 of this preferred embodiment of the present invention has a connecting member 69, and bellows 68 interposed between the piston body 66 and the adapter 67.

The connecting member 69 has a thick planar shape and two thin portions 70, 70 has which act as bending joints formed at the lower surface thereof so that the piston body 66 may correctly telescope within the cylinder bore 25 upon squeezing of the trigger 14. The piston body 66 has oblique surfaces and recesses formed inside to bring the bellows 68 in close contact therewith, and outer peripheral skirt portion 75 formed with recesses 76 for air vent as will be hereinafter described in greater detail.

The adapter 67 has large-diameter, intermediate-diameter, and small-diameter bores 71, 72, and 73. The large-diameter, bore 71 of the adapter 67 is substantially half the length of the cylinder bore 25. The adapter 67 has an inner stem formed therein axially to engage the bellows 68 at one end. A hole 47 is perforated at the intermediate diameter bore 72, and an outlet hole 48 is perforated at the side wall of the small-diameter bore 73 of the adapter 67. The valve 50 is constructed in the same manner as that shown in FIG. 1. Small step is formed on the inner surface of the cylinder bore 25 of this preferred embodiment of the liquid dispensing device as shown in FIG. 6. One or several strips of longitudinal ribs 80 are formed at the small step of the cylinder bore 25. Outwardly projected annular projection 74 is formed in the vicinity of the end of the adapter 67. A plurality of internally projected recesses 76 are formed on the skirt portion 75 of the piston body 66. There are thus provided a gap 35 communicating with the hole 36 at the portion inside from the projection 74 of the adapter 67.

In operation of this preferred embodiment of the liquid dispensing device thus constructed according to the present invention, when the trigger 14 is squeezed, the piston body 66 is retracted through the connecting member 69 into the cylinder bore 25 to thus contract the bellows 68. When the trigger 14 is released, the piston body 66 is extended to the original position by the returning force of the bellows 68. If the trigger 14 is squeezed and released several times for the priming of the liquid dispensing device, the liquid in the container 16 is filled into the pressurizing chamber. When the trigger 14 is further squeezed repeatedly, the annular thin portions 51 and 52 of the valve 50 are opened and closed to spray the liquid from the nozzle hole 22 in the same manner as the first preferred embodiment shown in FIGS. 1 and 2.

More particularly, when the piston 65 is retracted into the cylinder bore 25 upon squeezing of the trigger 14, the recesses 76 of the skirt portion 75 of the piston body 66 is brought into contact with the longitudinal ribs 80 of the cylinder bore 25, and the large-diameter bore 71 of the adapter 67 is protruded into the recesses 76 of the piston body 66 as shown in FIGS. 7 and 8 with the result that an air passage is formed by the recesses 76 and the deflected large-diameter bore 71 to thereby communicate the chamber 81 formed by the bellows 68, the skirt portion 75, and the large-diameter bore 71 with the atmosphere, and the atmosphere is simultaneously communicated with container 16 through the gap 35, the hole 36 and the annular gap 29. This air passage thus formed prevents the buildup of negative pressure in chamber 81. If this air passage is not formed, the liquid is taken into the chamber 81 upon pumping action to thereby obstruct the operations of the piston 65 and the bellows 68. In addition, if the liquid dispensing device accidentally falls over during its transportation after the liquid is filled in the container 16 to cause the liquid to be introduced into the chamber 81, it disables priming of the liquid dispensing device and normal operation of the device. If the liquid dispensing device is triggered without notice of the accident, the liquid leaks from the device. However, since the air passage is formed in the preferred embodiment of the liquid dispensing device of the present invention as described above, it can eliminate such difficulty.

THIRD EMBODIMENT

Figure 9:
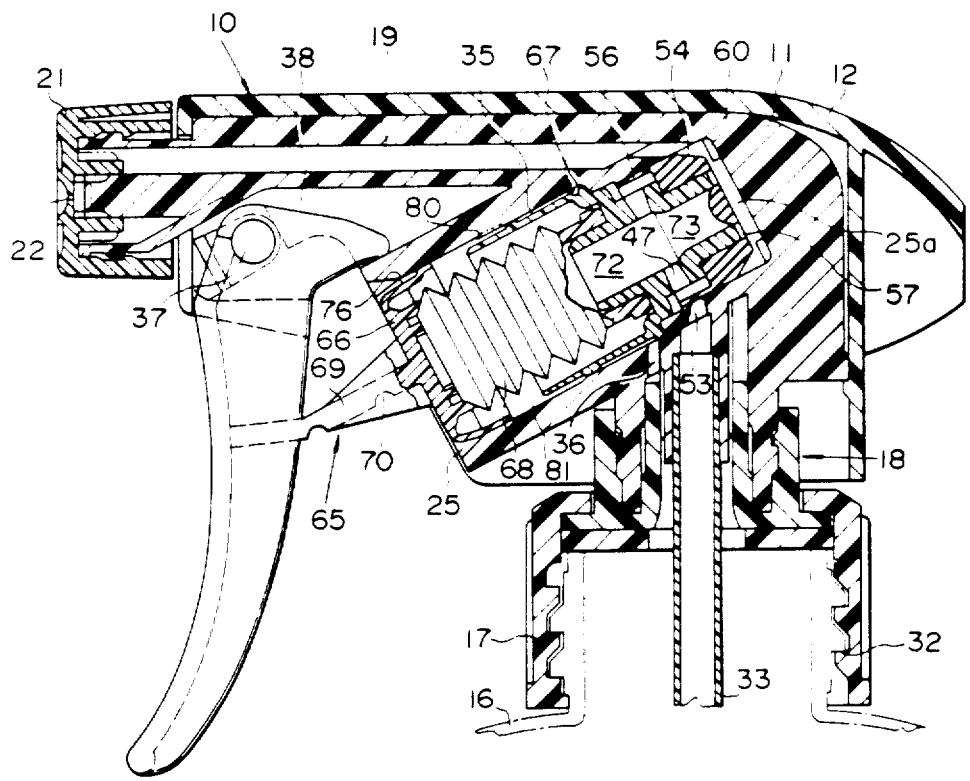
FIG. 9 is a vertical sectional view of a liquid dispensing device of still another preferred embodiment of the present invention.

FIG. 9 shows still another embodiment of the liquid dispensing device employing the valve 54 shown in FIGS. 3 through 5 in the preferred embodiment shown in FIGS. 6 through 8 according to the present invention. One or several strips of longitudinal ribs 80 are formed at the small step of the cylinder bore 25 in the same manner as shown in FIG. 6. When the piston 65 is retracted into the cylinder bore 25 upon squeezing of the trigger 14, the skirt portion 75 of the piston body 66 is ridden on the ribs 80 to form an air vent gap therebetween in the same manner as the preferred embodiment shown in FIGS. 6 through 8.

INDUSTRIAL APPLICABILITY

It should be understood from the foregoing description that since the liquid dispensing device of the present invention is thus constructed and operated, it is advantageously useful for a manually liquid spraying device of perfume, cosmetic chemicals, cleanser, bleaching agent, etc. so as to effectively eliminate the dirts and loss of the liquid but to conveniently spray the liquid.

What is claimed is:

1. A manually operated liquid dispensing device having a body, a cylindrical bore formed in said body and having an inlet and an outlet, a nozzle having a nozzle hole and coupled for communication with the outlet of said cylindrical bore, a piston slidably mounted within said cylindrical bore, and a trigger coupled to said portion for slidably moving said piston to produce a pumping action for spraying liquid from said nozzle hole, and further comprising:
   a hollow adapter member having an inlet and an outlet and positioned within said cylindrical bore so that the inlet and outlet of said adapter member may communicate with said inlet and outlet, respectively, of said cylindrical bore; and
   an elastic valve telescoped over one end of said adapter, said valve including a first portion forming a valve body, a second portion integrally coupled to and extending from said valve body, and a third portion integrally coupled to and extending from said valve body, said valve being positioned within said cylindrical bore and said second portion being constructed and arranged to allow the passage of a liquid from the inlet of the cylindrical bore through the inlet of the adapter to within said adapter in response to movement of said piston in a first direction and to prevent liquid flow through said adapter member inlet and the inlet of said cylindrical bore in response to movement of said piston in a second direction, said third portion being constructed and arranged to permit a flow of liquid through the outlet of said adapter and the outlet of said cylindrical bore to provide liquid to said nozzle and said nozzle hole in response to piston movement in said second direction and preventing liquid flow through said adapter member outlet and the outlet of said cylindrical bore in response to piston movement in said first direction.

2. The liquid dispensing device of claim 1 wherein said first portion has a trapezoidal cross-section, said second portion is a thin annular portion integral with and projecting away from said body portion, and said third portion is a semispherical portion coupled to said first portion by a radial coupler.

3. The liquid dispensing device of claim 1 wherein said first portion is a thick annular portion, said second portion is a thin annular portion integral with and projecting away from said first portion, and said third portion is a thin annular portion integral with and projecting away from said body portion.

4. A manually operated liquid dispensing device having a body, a cylindrical bore formed in said body and having an inlet and an outlet, a nozzle having a nozzle hole and coupled for communication with the outlet of said cylindrical bore, a piston slidably mounted within said cylindrical bore, and a trigger coupled to said piston for slidably moving said piston to produce a pumping action for spraying liquid from said nozzle hole, and further comprising:
   an elastic material valve means located within said cylindrical bore for controlling the entry of liquid into said bore through said inlet and the expulsion of liquid from said cylindrical bore through said outlet and comprising an annular thick body having a trapezoidal cross-section, an annular thin portion integral with and projecting away from the annular thick body, and a semispherical portion connected to said annular thick body by a radial coupler, said annular thin portion being constructed and arranged to permit the passage of liquid into said cylindrical bore through the inlet of said cylindrical bore in response to movement of said piston in a first direction and prohibiting liquid flow through said inlet during expulsion of liquid from said cylindrical bore during movement of said piston in a second direction, said semispherical portion being constructed and arranged to permit the expulsion of liquid from said cylindrical bore through said outlet in response to movement of said piston in said piston in said second direction and to prohibit a flow of liquid through the outlet of said cylindrical bore in response to movement of said piston in said first direction.

5. A manually operated liquid dispensing device having a body, a cylindrical bore formed in said body and having an inlet and an outlet, said cylindrical bore having an inner wall on which are formed longitudinal ribs, a nozzle having a nozzle hole and coupled for communication with the outlet of said cylindrical bore, a piston slidably mounted within said cylindrical bore, said piston including a cap-shaped piston body, a connecting member coupled to said piston body, a bellows coupled to said piston body and a skirt portion coupled to said piston body and having recesses therein, and a trigger coupled to said connecting member of said piston for slidably moving said piston to produce a pumping action for spraying liquid from said nozzle hole, and further comprising:
   a hollow adapter means positioned within the cylindrical bore for receiving said piston and having an inlet for communicating with the inlet of said cylindrical bore and an outlet for communicating with the outlet of said cylindrical bore and for receiving one end of said bellows, said bellows being interposed between said piston body and said adapter means and said piston and adapter means forming a chamber therebetween and said longitudinal ribs cooperating with said recesses during movement of said piston to form an air gap which prevents the build-up of negative pressure in said chamber formed between said piston and said adapter means; and an elastic material valve means coupled to said adapter means and located within said cylindrical bore for controlling the entry of liquid into said bore through its inlet and the expulsion of liquid from said cylindrical bore through its outlet and comprising an annular thick body having a trapezoidal cross-section, an annular thin portion integral with and projecting away from the annular thick body, and a semispherical portion connected to said annular thick body by a radial coupler, said annular thin portion being constructed and arranged to permit the passage of liquid into said cylindrical bore through the inlets of said cylindrical bore and said adapter means in response to movement of said piston in a first direction and prohibiting liquid flow through said inlets during expulsion of liquid from said adapter means during movement of said piston in a second direction, said semispherical portion being constructed and arranged to permit the expulsion of liquid from said adapter means through said outlets of said cylindrical bore and adapter means in response to movement of said piston in said second direction and to prohibit a flow of liquid through the outlets in response to movement of said piston in said first direction.

6. A manually operated liquid dispensing device having a body, a cylindrical bore formed in said body and having an inlet and an outlet, a nozzle having a nozzle hole and coupled for communication with the outlet of said cylindrical bore, a piston slidably mounted within said cylindrical bore, and a trigger coupled to said piston for slidably moving said piston to produce a pumping action for spraying liquid from said nozzle hole, and further comprising:

a hollow adapter member having an inlet and an outlet and positioned within said cylindrical bore so that the inlet and outlet of said adapter member may communicate with said inlet and outlet, respectively, of said cylindrical bore; and an elastic valve surrounding one end of said adapter, said valve including a first portion forming a valve body and having a trapezoidal cross-section, a second portion integrally coupled to and extending from said valve body, and a third portion integrally coupled to and extending from said valve body, said second portion being a thin annular portion that projects away from said body portion and said third portion being a semispherical portion coupled to said first portion by a radial coupler, said valve being positioned within said cylindrical bore and said second portion being constructed and arranged to allow the passage of a liquid from the inlet of the cylindrical bore through the inlet of the adapter to within said adapter in response to movement of said piston in a first direction and to prevent liquid flow through said adapter member inlet and the inlet of said cylindrical bore in response to movement of said piston in a second direction, said third portion being constructed and arranged to permit a flow of liquid through the outlet of said adapter and the outlet of said cylindrical bore to provide liquid to said nozzle and nozzle hole in response to piston movement in said second direction and to prevent flow of liquid through said adapter member outlet and the outlet of said cylindrical bore in response to piston movement in said first direction.

7. A manually operated liquid dispensing device having a body, a cylindrical bore formed in said body and having an inlet and an outlet, a nozzle having a nozzle hole and coupled for communication with the outlet of said cylindrical bore, a piston slidably mounted within said cylindrical bore, and a trigger coupled to said piston for slidably moving said piston to produce a pumping action for spraying liquid from said nozzle hole, and further comprising:

a hollow adapter member having an inlet and an outlet and positioned within said cylindrical bore so that the inlet and outlet of said adapter member may communicate with said inlet and outlet, respectively, of said cylindrical bore; and an elastic valve surrounding one end of said adapter, said valve including a first thick annular portion forming a valve body, a second portion integrally coupled to and extending from said valve body, and a third portion integrally coupled to and extending from said valve body, said second and third portions being thin annular portions projecting away from said body portion, said valve being positioned within said cylindrical bore and said second portion being constructed and arranged to allow the passage of a liquid from the inlet of the cylindrical bore through the inlet of the adapter to within said adapter in response to movement of said piston in a first direction and to prevent liquid flow through said adapter member inlet and the inlet of said cylindrical bore in response to movement of said piston in a second direction, said third portion being constructed and arranged to permit a flow of liquid through the outlet of said adapter and the outlet of said cylindrical bore to provide liquid to said nozzle and nozzle hole in response to piston movement in said second direction and preventing liquid flow through said adapter member outlet and the outlet of said cylindrical bore in response to piston movement in said first direction.

* * * * *